Dec. 19, 1939.  H. SCHRÖDER  2,183,724

REMOTE CONTROL DEVICE

Filed June 24, 1938

INVENTOR
HEINRICH SCHRÖDER
BY
ATTORNEY

Patented Dec. 19, 1939

2,183,724

UNITED STATES PATENT OFFICE 2,183,724

REMOTE CONTROL DEVICE

Heinrich Schröder, Berlin, Germany, assignor to Telefunken Gesellschaft für Drahtlose Telegraphie m. b. H., Berlin, Germany, a corporation of Germany Application June 24, 1938, Serial No. 215,574
In Germany June 24, 1937

4 Claims. (Cl. 188—172)

The invention relates to a remote control device comprising a direct current motor and a brake which is electromagnetically lifted off by the motor current.

For manipulating from a distance some parts, e. g. of a tuning device of a high-frequency apparatus, direct current motors already have been used which are switched on and switched off again from the control place. In order that the device to be remotely controlled stops as exactly as possible in the position just reached at the moment of switching-off, it has been proposed to provide electromagnetically controlled brakes acting at the moment of switching-off the motor, on the motor shaft or the shaft of the device to be driven. Such a braking device usually consists of a braking pad attached to a pivoted armature being pressed by a spring on the driving shaft or a brake disc attached to it and of an electromagnet, the winding of which is so connected to the motor circuit that the electromagnet is likewise excited when the motor is switched in and removes against the action of the spring the armature from the brake disc. Thus, when the motor is switched in, the winding of the electromagnet is also excited thereby attracting the armature and releasing the motor to rotate. When the motor current is interrupted, the winding of the electromagnet also is interrupted whereby the brake armature is pressed again by the spring tension on the brake disc and the rotation of the motor is checked. The device remains after the switching-off permanently currentless.

The winding of the electromagnet of the braking device may be connected either in parallel or in series with the motor winding. Both connections have some disadvantages which reduce, as it will be explained below in more detail, the efficiency of the braking device.

According to the present invention an instantaneous checking is effected by so subdividing the winding of the electromagnet of the braking device that the one partial winding is connected in series with the voltage source and the motor winding and the other partial winding is shunted across the voltage source, and by so choosing the direction of the both windings that with the voltage source switched-in the magnetic inductions arising from the both windings aid one another.

Figure 1:
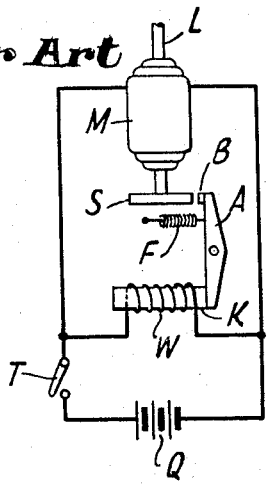
Figure 2:
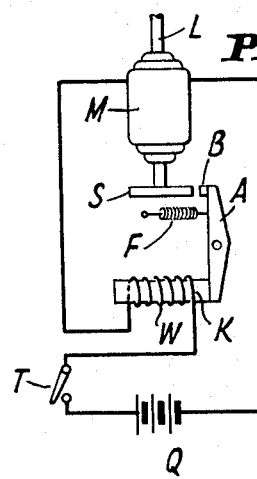
Figure 3:
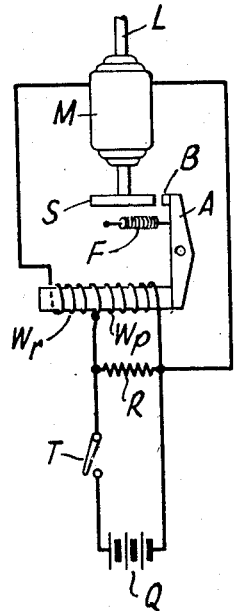

In the drawing, Fig. 1 illustrates a known electro-magnetic brake wherein the brake winding is shunted across the source;

Fig. 2 illustrates a known braking arrangement wherein the brake winding is in series with the source and the motor; and, Fig. 3 illustrates an electromagnetic braking device for a motor circuit constructed in accordance with the present invention.

The advantage of the invention goes forth from the following consideration: Fig. 1 shows the braking device with the magnet winding shunted across the motor winding. The shaft L of the motor M coupled to the device to be remotely controlled carries at the one side a brake disc S on which the brake block B of the pivoted armature A is pressed by the tension of the spring F. The core K, when current is passing through the winding W attached to it, pulls off the armature A from the brake disc S against the tension of the spring F. Motor winding and brake w.nding are connected in parallel across the direct current source Q which is to be disconnected by a switch T at the control place.

With this arrangement it has been found that the motor after opening the switch T running down generates a current passing through the brake winding W. Thereby the armature A remains attracted and braking is delayed.

With an arrangement according to Fig. 2 the magnet winding W is connected in series with the motor winding across the voltage source Q. This connection has the disadvantage that the starting torque of the motor is considerably reduced.

Fig. 3 shows an embodiment of the invention. In this arrangement the winding $W_p$ is shunted across the current source and consists of many turns of thin wire. Suitably it is so dimensioned that it sets up about half the magnetic induction which is necessary for attracting the armature. The winding $W_r$ is joined in series with the motor and consists of few turns of thick wire. In operation it is to set up also about half the induction needed altogether.

Both windings are wound in such a direction that the magnetic inductions set up by them with the current source switched-in and the motor running aid one another in such a manner that the created magnetic force is stronger, i. e. about double as strong as if only one winding would exist. As seen from the motor winding both windings are joined in series. The short-circuit current produced after switching-off by the motor still running passes through both coils in such a way that these are in series-opposing for this direction of current, i. e. in this case the resulting induction is equal to the difference of the two inductions.

In order that an almost complete compensation of the both fields occurs at switching-off it is necessary to shunt a resistance R across the winding $W_p$ by which the induction created by the winding $W_r$ after switching-off becomes more effective. The current produced by the motor namely otherwise would have to pass through the high-resistance winding $W_p$ and would therefore produce in the winding $W_r$ comprising only few turns a too weak induction so that the action of the winding $W_p$ would remain preponderating. By means of the resistance R which has about half the number of ohms of the winding $W_p$ the induction produced by $W_r$ becomes stronger (as the current increases) and the induction created by $W_p$ gets weaker because of the shunt by the resistance R. Thereby it may be attained that the two inductions in the moment of switching-off practically completely cancel each other and no magnetic force results.

The armature thus is directly released and the motor is braked without delay after the current source is switched off. The low-resistance winding B joined in series has practically no detrimental influence on the starting torque.

What I claim as new and desire to secure by Letters Patent of the United States, is—

1. In a device of the kind described, an electric motor, a source of voltage, an electromagnetically operated brake provided with a bipartite winding characterized in that one partial winding is joined in series with the motor winding across the voltage source while the other partial winding is shunted across the voltage source, said two windings being dimensioned and arranged so that with the voltage source connected to the circuit the magnetic fields produced by the two parts of the winding produce substantially equal and aiding magnetic inductions.

2. In a device of the kind described an electric motor, a motor circuit including a source of voltage, an electromagnetically operated brake for said motor of the type which removes the braking action when electrical energy is applied thereto, said brake being provided with a bipartite winding, means for connecting one of the parts of said winding in series with the motor winding across the source of voltage, means for shunting the other part of the winding across the voltage source, said windings being arranged and dimensioned so that with the voltage source thrown into the circuit the magnetic fields produced by the two parts of the winding aid each other, a resistance device connected across the winding connected across the voltage source, said resistance being of such a value with respect to the winding that the opposed magnetic inductions produced by the two parts of the winding by current generated by the motor after disconnecting the voltage source are approximately of equal intensity.

3. In a device of the kind described, an electric motor, a source of voltage, an electromagnetically operated brake, said brake being provided with a bipartite winding, means for connecting one of said parts of the winding in series with the motor winding and the source of voltage, means for connecting the other part of the winding across the voltage source, said parts of the winding being arranged so that with the voltage source thrown into the circuit the magnetic fields produced by the two parts of the winding aid each other, a resistance connected in parallel to the part of the winding connected across the source, said resistance having an ohmic value which is approximately half the ohmic resistance of the last named winding.

4. In a device of the kind described, an electric motor having a pair of input terminals, an electromagnetic brake provided with a bipartite winding, means for connecting said winding between the motor input terminals, a resistance element shunted across one of the parts of said winding, a pair of terminals adapted to be connected to a source of voltage, means including a switch for connecting one of said last named pair of terminals to one end of said resistance, and means for connecting the other of said last named pair of terminals to the other end of said resistance.

HEINRICH SCHRÖDER.